US011223577B2

(12) United States Patent
Vu et al.

(10) Patent No.: US 11,223,577 B2
(45) Date of Patent: *Jan. 11, 2022

(54) SWITCH NETWORK ARCHITECTURE

(71) Applicant: HEWLETT PACKARD ENTERPRISE DEVELOPMENT LP, Houston, TX (US)

(72) Inventors: Paul Vu, Roseville, CA (US); Guodong Zhang, Plano, TX (US); Mike Witkowski, Tomball, TX (US); John Butler, Houston, TX (US); Robert Teisberg, Georgetown, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,421

(22) Filed: Mar. 16, 2020

(65) Prior Publication Data
US 2020/0220819 A1 Jul. 9, 2020

Related U.S. Application Data

(63) Continuation of application No. 15/766,002, filed as application No. PCT/US2015/055129 on Oct. 12, 2015, now Pat. No. 10,616,142.

(51) Int. Cl.
H04L 12/00 (2006.01)
H04L 12/931 (2013.01)
(Continued)

(52) U.S. Cl.
CPC ...... *H04L 49/455* (2013.01); *H04L 12/40104* (2013.01); *H04L 49/15* (2013.01);
(Continued)

(58) Field of Classification Search
CPC . H04L 49/455; H04L 12/40104; H04L 49/15; H04L 49/1507; H04L 49/1576; H04L 49/351; H04L 49/35; H04L 49/45
See application file for complete search history.

(56) References Cited

U.S. PATENT DOCUMENTS 5,627,788 A 5/1997 Chang et al.
6,181,619 B1 1/2001 Bogin et al.
(Continued)

FOREIGN PATENT DOCUMENTS

CN 1574751 A1 2/2005
CN 102394782 A 3/2012
(Continued)

OTHER PUBLICATIONS

Dr. Franz-Joachim Kauffels, "40GBase-T," (Research Paper), Apr. 23, 2009, 20 pages.
(Continued)

*Primary Examiner* — Lakeram Jangbahadur

(57) ABSTRACT

One embodiment describes a network system. The system includes a primary enclosure including a network switch system that includes a plurality of physical interface ports. A first one of the plurality of physical interface ports is to communicatively couple to a network. The system further includes a sub-enclosure comprising a network interface card (NIC) to which a computer system is communicatively coupled and a downlink extension module (DEM) that is communicatively coupled with the NIC and a second one of the plurality of physical interface ports of the network switch system to provide network connectivity of the computer system to the network via the network switch system.

12 Claims, 2 Drawing Sheets

(51) Int. Cl.
  *H04L 12/40* (2006.01)
  *H04L 12/933* (2013.01)
(52) U.S. Cl.
  CPC ...... *H04L 49/1507* (2013.01); *H04L 49/1576* (2013.01); *H04L 49/351* (2013.01); *H04L 49/35* (2013.01); *H04L 49/45* (2013.01)

(56) References Cited

U.S. PATENT DOCUMENTS

| | | | |
|---|---|---|---|
| 6,324,652 B1 | 11/2001 | Henderson et al. | |
| 6,516,352 B1 | 2/2003 | Booth et al. | |
| 6,618,392 B1 | 9/2003 | Richard | |
| 6,785,793 B2 | 8/2004 | Aboulenein et al. | |
| 6,799,241 B2 | 9/2004 | Kahn et al. | |
| 6,976,122 B1 | 12/2005 | Sander et al. | |
| 7,610,418 B2 | 10/2009 | Holland et al. | |
| 7,761,656 B2 | 7/2010 | Madrid et al. | |
| 8,284,771 B1 | 10/2012 | Julien et al. | |
| 8,406,128 B1 | 3/2013 | Brar et al. | |
| 8,495,194 B1 * | 7/2013 | Brar | H04L 49/1515 709/223 |
| 8,607,225 B2 | 12/2013 | Rudd | |
| 8,619,483 B2 | 12/2013 | Katoch et al. | |
| 8,661,309 B2 | 2/2014 | Bliss et al. | |
| 8,880,739 B1 | 11/2014 | Brar et al. | |
| 2003/0161348 A1 | 8/2003 | Mills et al. | |
| 2004/0120210 A1 | 6/2004 | Dong-Yang | |
| 2004/0196728 A1 | 10/2004 | Yasurou | |
| 2004/0208180 A1 | 10/2004 | Light et al. | |
| 2004/0257990 A1 | 12/2004 | Lingafelt et al. | |
| 2005/0002253 A1 | 1/2005 | Shi et al. | |
| 2005/0002390 A1 | 1/2005 | Kim et al. | |
| 2005/0055456 A1 | 3/2005 | Chalupsky et al. | |
| 2005/0138191 A1 | 6/2005 | Seto et al. | |
| 2006/0212636 A1 | 9/2006 | Akihiro | |
| 2007/0110088 A1 * | 5/2007 | Kemp | H04L 49/1515 370/419 |
| 2007/0165663 A1 | 7/2007 | Aloni et al. | |
| 2008/0140819 A1 | 6/2008 | Bailey et al. | |
| 2008/0239858 A1 | 10/2008 | Rajan et al. | |
| 2009/0074001 A1 | 3/2009 | Kalkunte et al. | |
| 2009/0232151 A1 | 9/2009 | Furlong et al. | |
| 2010/0095185 A1 | 4/2010 | Ganga et al. | |
| 2011/0035498 A1 | 2/2011 | Shah et al. | |
| 2012/0272083 A1 | 10/2012 | Minoru | |
| 2013/0235762 A1 | 9/2013 | Anantharam et al. | |
| 2014/0016637 A1 | 1/2014 | Masood et al. | |
| 2014/0032066 A1 | 1/2014 | Shigeru | |
| 2014/0115137 A1 | 4/2014 | Singh | |
| 2015/0098473 A1 | 4/2015 | Ariel | |
| 2015/0271244 A1 | 9/2015 | Bloch et al. | |
| 2016/0335216 A1 * | 11/2016 | Krishnan | G06F 13/4027 |
| 2016/0373292 A1 | 12/2016 | Benoit | |
| 2017/0054603 A1 * | 2/2017 | Kulkarni | H04L 41/0893 |
| 2017/0244817 A1 | 8/2017 | Zhang et al. | |

FOREIGN PATENT DOCUMENTS

| | | | |
|---|---|---|---|
| EP | 2557739 A1 | 2/2013 | |
| EP | 2688243 A1 | 1/2014 | |
| EP | 3284218 A1 | 2/2018 | |
| WO | 2004/021194 A2 | 3/2004 | |
| WO | WO-2015147840 A1 * | 10/2015 | H04L 12/6418 |
| WO | 2017/065732 A1 | 4/2017 | |

OTHER PUBLICATIONS

Extended European Search Report received for EP Patent Application No. 15906343.7, dated Feb. 12, 2018, 9 pages.

Freesacle Semiconductor Inc , "Initializing SDRAM Parameters for Motorola MPC106-based Systems," Rev 0.1, Jun. 2003, 8 pages.

International Search Report and Written Opinion received for PCT Application No. PCT/US2014/067935, dated Aug. 11, 2015, 11 pages.

International Search Report and Written Opinion received for PCT Application No. PCT/US2015/055129, dated Jul. 12, 2016, 8 pages.

International Search Report and Written Opinion received for PCT Application No. PCT/US2015/055320, dated Jul. 13, 2016, 13 pages.

Mellanox Technologies Inc., "Realizing the Full Potential of Server, Switch & I/O Blades with Infiniband Architecture," 2009, pp. 1-11 pages.

* cited by examiner

SWITCH NETWORK ARCHITECTURE

BACKGROUND

Modern Ethernet switches continue to increase in scale, such as with respect to a higher port count per switch chip or device and a greater bandwidth per port. Some server (blade) enclosures are typically designed to support a fixed, small number of servers per enclosure, such as to support enterprise data centers, small and medium businesses (SMB), and/or remote/branch offices. Typically, these server enclosures also have slots, or bays, where a number of network switch modules are installed to provide connectivity between the servers/blades themselves, and between the servers/blades and external networks. In a single server enclosure, network connectivity can be optimized to a small, fixed number of server network interface card (NIC) connections. To achieve an optimum balance in such connectivity, network switch devices or chips, such as implemented via an application specific integrated circuit (ASIC) with high radix, can be utilized to increase port count and port bandwidth and to provide connectivity to more than one enclosure.

DETAILED DESCRIPTION

In a network system architecture, a group of enclosures can be implemented to form an enclosure group to provide connectivity for one or more computer systems installed in the enclosures of the enclosure group to a network. An enclosure group can include a primary enclosure, which can be configured as a blade enclosure with at least one network switch system installed (e.g., a blade switch), or a top-of-rack (ToR) enclosure that does not house a computer system, but instead only includes one or more network switch systems (e.g., a ToR switch). The network switch system in the primary enclosure can include a plurality of ports, such that one or more of the ports can be communicatively coupled to one or more external networks, and one or more of the other ports being coupled to a respective one or more downlink extension modules (DEMs) that are each provided in one or more separate respective sub-enclosures. In the example of the network switch system being installed in a blade enclosure, some of the ports can be communicatively coupled to the bays or slots in which the computer systems are installed in the same enclosure. Each of the primary enclosure and the one or more sub-enclosures can include one or more computer systems (e.g., servers), or blades, each including a network interface card (NIC) that can provide network connectivity to the network.

The NIC on computer systems that are installed within each of the sub-enclosures can be coupled to a respective port of the network switch system in the primary enclosure, such that the computer system(s) associated with each of the sub-enclosures can be provided network connectivity via the network switch system in the primary enclosure. The connectivity can be provided via the DEM in the sub-enclosure and the network connection between the DEM and the network switch system in the primary enclosure. Additionally, the network system architecture can include a plurality of primary enclosures, each including a network switch system coupled to respective DEMs in respective sets of sub-enclosures to form a network logical domain. Each of the primary enclosures can be communicatively coupled via the respective network switch systems, such as in a loop configuration, such that each of the network switch system can be communicatively coupled to a pair of network switch systems of a respective pair of primary enclosures via a first physical interface port and a second physical interface port, respectively, of the plurality of primary enclosures.

Figure 1:
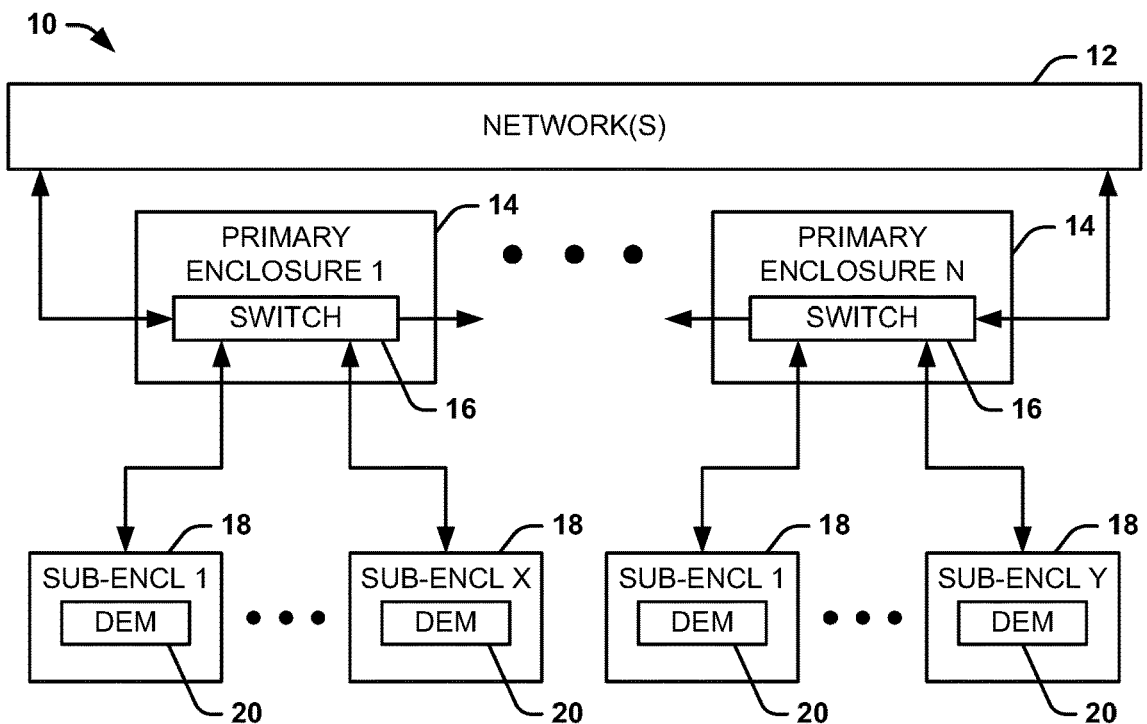
FIG. 1 illustrates an example of a network system.

FIG. 1 illustrates an example of a network system 10. The network system 10 can be arranged as a network logical domain that is connected to one or more networks 12, such as one or more local area networks (LANs), one or more wide area networks (WAN), or the Internet. The network system 10 includes a plurality N of primary enclosures 14, where N is a positive integer. As described herein, the term "enclosure" refers to a physical enclosure, such as a server rack or cabinet, that includes a computer system (e.g., an enterprise server), as well as power components, temperature management components, network connection components, and/or various interconnection devices. As an example, the primary enclosures 14 can include a blade server enclosure or top-of-rack (ToR) switch.

In the example of FIG. 1, each of the primary enclosures 14 includes a network switch system (demonstrated as "SWITCH") 16. As an example, the network switch system 16 associated with each of the primary enclosures 14 can be configured as a blade switch or a ToR switch, which can be implemented as an application specific integrated circuit (ASIC) switch having a high port radix. Thus, each of the network switch systems 16 can include a plurality of physical interface (PHY-layer) ports that can be controlled to provide communicative connectivity of the components of the network system 10. As an example, one or more of the physical interface ports of the network switch system 16 in each of the primary enclosures 14 can be communicatively coupled to the network(s) 12, such as to separate networks 12 or via multiple connections to a single one of the network(s) 12. In addition, as described in greater detail herein, the primary enclosures 14 can be communicatively coupled to each other, such as in a loop arrangement, via additional physical interface ports of the network switch systems 16.

In addition, the network system 10 includes a plurality of sub-enclosures (demonstrated as "SUB-ENCL") 18. In the example of FIG. 1, the network system 10 includes a first set X of sub-enclosures 18 that are associated with a first one of the primary enclosures 14, demonstrated as PRIMARY ENCLOSURE 1, and a second set Y of sub-enclosures 18 that are associated with a second one of the primary enclosures 14, demonstrated as PRIMARY ENCLOSURE N, where X and Y are positive integers that may or may not equal. As an example, one or more of the sub-enclosures 18 can likewise be configured as blade enclosures. Each of the primary enclosures 14 and the associated set of sub-enclosures 18 can thus form an enclosure group in the network system 10, and thus a portion of the network logical domain.

Each of the sub-enclosures 18 includes a downlink extension module (DEM) 20 that can provide connectivity of a respective computer system to the network(s) 12. The DEM 20 in each of the first set of sub-enclosures 18 can be communicatively coupled to a respective one of the physical interface ports of the network switch system 16 of the respective one of the primary enclosures 14 (e.g., PRIMARY ENCLOSURE 1). Similarly, the DEM 20 in each of the second set of sub-enclosures 18 can be communicatively coupled to a respective one of the physical interface ports of the network switch system 16 of the respective one of the primary enclosures 14 (e.g., PRIMARY ENCLOSURE N). Therefore, the computer system associated with each of the sub-enclosures 18 can be communicatively coupled to the network(s) 12 via the network switch system 16 in the respective primary enclosures 14. As an example, each of the sub-enclosures 18 in a given enclosure group can be coupled to a single one of the network(s) 12 via a single physical interface port of the respective network switch system 16, redundantly to a single one of the network(s) 12 via multiple physical interface ports of the network switch system 16, to multiple separate networks 12 via respective physical interface ports of the network switch system 16, or a combination thereof.

Therefore, the network system 10 provides a network topology in which the high radix of the network switch systems 16 is largely utilized while providing flat network connectivity among associated computer systems to substantially mitigate latency. Therefore, the network system 10 provides a more efficient utilization of the high radix of the network switch systems 16 than typical network topologies (e.g., blade switch topologies) in which multiple blade servers are provided in a given enclosure, each with a respective network switch system. Such typical network topologies can result in the physical interface ports of the switches being trapped and/or unused, which can lead to an increased cost per connected server or device on the associated network topology. Additionally, the network system 10 is highly scalable based on adding additional enclosure groups (e.g., hundreds) that include a primary enclosure 14 and one or more sub-enclosures 18 to the network logical domain coupled to the network(s) 12, and can scale up to support higher lane speeds. For example, the network system 10 can be limited only by a number of switch-hops that can be tolerated by the applications running on the associated computer systems.

Figure 2:
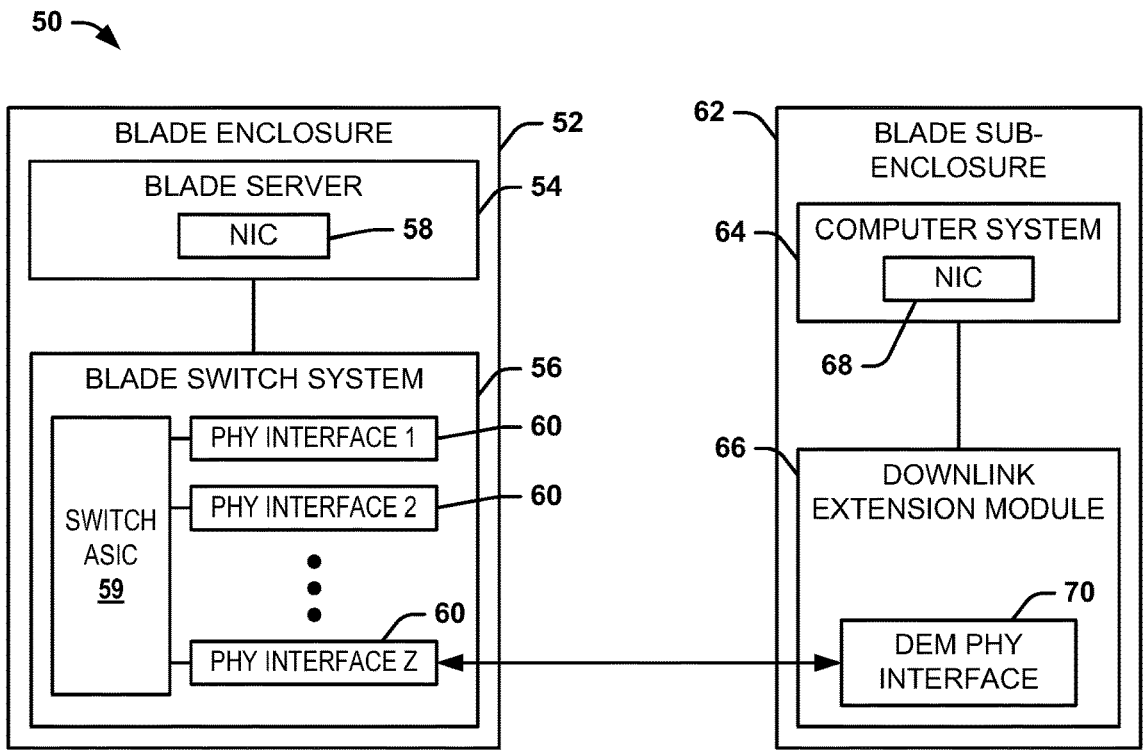
FIG. 2 illustrates an example of a blade switch enclosure group.

FIG. 2 illustrates an example of a blade switch enclosure group 50. The blade switch enclosure group 50 can correspond to any one of the enclosure groups in the example of FIG. 1 that include a primary enclosure 14 and one or more sub-enclosures 18 in the network logical domain coupled to the network(s) 12. Therefore, reference is to be made to the example of FIG. 1 in the following description of the example of FIG. 2.

The blade switch enclosure group 50 includes a blade enclosure 52 that includes a blade server 54 and a blade switch system 56. The blade enclosure 52 can correspond to a primary enclosure 14 in the example of FIG. 1, such that the blade switch system 56 can correspond to the associated network switch system 16 in the example of FIG. 1. As an example, the blade enclosure 52 can include only a single blade server 54 and blade switch system 56, as opposed to typical blade enclosures that include a bank of blade servers and blade switches. Therefore, only a single blade switch system 56 needs to be maintained in the blade switch enclosure group 50, such that only a single software update needs to be provided to maintain the blade switch system 56, as opposed to typical blade switch systems.

The blade server 54 includes a network interface card (NIC) 58 that is coupled to the blade server 54 and can provide network interface for the blade server 54. As an example, the blade server 54 can be communicatively coupled to the blade switch system 56 through a backplane, and can have network connectivity based on the NIC 58 via the blade switch system 56. Therefore, the blade enclosure 52 can provide connectivity of the blade server 54 to the network(s) 12 via the blade switch system 56. In the example of FIG. 2, the blade switch system 56 includes a switch ASIC 59 and a plurality Z of physical interface (PHY-layer) ports 60, where Z is a positive integer. As an example, one of the physical interface ports 60 can be coupled to the network(s) 12 to provide network connectivity to the blade switch enclosure group 50.

The blade switch enclosure group 50 also includes a blade sub-enclosure 62. The blade sub-enclosure 62 includes a computer system 64, such as a blade server, and a DEM 66. The blade sub-enclosure 62 can correspond to a sub-enclosure 18 in the example of FIG. 1, such that the DEM 66 can correspond to the associated DEM 20 in the example of FIG. 1. As an example, the computer system 64 can be communicatively coupled to the DEM 66 through a backplane. The computer system 64 includes a NIC 68 that is coupled to the computer system 64 and can provide network interface for the computer system 64. In the example of FIG. 2, the DEM 66 is communicatively coupled to the $Z^{th}$ one of the physical interface ports 60 of the blade switch system 56 of the blade enclosure 52 via a DEM physical (PHY-layer) interface 70. Therefore, the computer system 64 can be provided network connectivity to the network(s) 12 via the blade switch system 54.

In addition, the blade switch enclosure group 50 can include one or more additional sub-enclosures that can be configured substantially the same as the blade sub-enclosure 62. For example, the additional one or more sub-enclosures 62 can be communicatively coupled to separate respective physical interface ports 60 of the blade switch system 56 to provide network connectivity of computer systems associated with the one or more additional sub-enclosures 62 to the network(s) 12 via the blade switch system 56. Furthermore, the blade switch enclosure group 50 can be part of a network logical domain, such that the blade switch system 56 can be communicatively coupled via separate respective physical interface ports 60 to a blade switch system of one or more separate blade enclosure that can be configured substantially the same as the blade enclosure 52. As an example, the blade switch system 56 can be coupled to a blade switch system of a respective first separate blade enclosure via a first physical interface port 60 and to a blade switch system of a respective second separate blade enclosure via a second physical interface port 60. Thus, the blade enclosures 52 can be communicatively coupled in a loop arrangement.

It is to be understood that the blade switch enclosure group 50 is not limited to the example of FIG. 2. For example, while the blade switch enclosure group 50 demonstrates that the blade switch system 56 is provided only in the blade enclosure 52 and the DEM 66 is provided only in the blade sub-enclosure 62, other arrangements in a given enclosure group (e.g., the blade switch enclosure group 50) are possible. As an example, the blade enclosure 52 could also include a DEM that is arranged substantially similar to the DEM 66, and the blade sub-enclosure 62 could also include a switch system (e.g., a blade switch system arranged substantially similar to the blade switch system 56) that is coupled to a network (e.g., the network(s) 12). Thus, the DEM in the blade enclosure 52 could be communicatively coupled to the switch system in the blade sub-enclosure 62, such as via a respective physical interface port and respective DEM physical interface (e.g., similar to the physical interface port 60 and DEM physical interface 70). Therefore, the blade enclosure 52 and the blade sub-enclosure 62 could be configured in a redundant manner with respect to each other to provide network connectivity, such that the each of the blade enclosure 52 and the blade sub-enclosure 62 are arranged as primary enclosure and sub-enclosure with respect to each other. In addition, a variety of arrangements of blade enclosure(s) 52 and blade sub-enclosure(s) 62 can be implemented as described herein to provide variability of combinations of connectivity of the associated computer systems to the network based on the coupling of DEMs and network switch systems in a given enclosure group.

Figure 3:
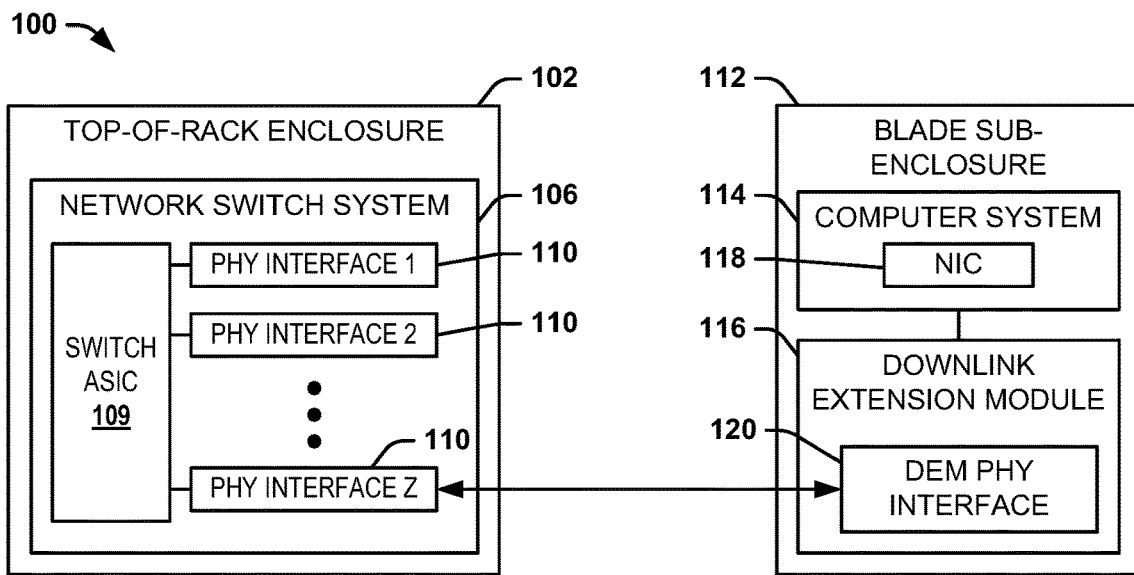
FIG. 3 illustrates an example of a top-of-rack switch enclosure group.

A given network enclosure group, as described herein, is not limited to being implemented as a blade switch system. FIG. 3 illustrates an example of a ToR switch enclosure group 100. The ToR switch enclosure group 100 can correspond to any one of the enclosure groups in the example of FIG. 1 that include a primary enclosure 14 and one or more sub-enclosures 18 in the network logical domain coupled to the network(s) 12. Therefore, reference is to be made to the example of FIG. 1 in the following description of the example of FIG. 3.

The ToR switch enclosure group 100 includes a ToR enclosure 102 that includes a ToR switch system 106. The ToR enclosure 102 can correspond to a primary enclosure 14 in the example of FIG. 1, such that the ToR switch system 106 can correspond to the associated network switch system 16 in the example of FIG. 1. As an example, the ToR enclosure 102 can include only a single ToR switch system 106, as opposed to typical ToR enclosures that include a bank of ToR switches. Therefore, only a single ToR switch system 106 needs to be maintained in the ToR switch enclosure group 100, such that only a single software update needs to be provided to maintain the ToR switch system 106, as opposed to typical ToR switch systems.

Similar to as described in the example of FIG. 2, the ToR switch system 106 includes a switch ASIC 109 and a plurality Z of physical interface (PHY-layer) ports 110, where Z is a positive integer. As an example, one of the physical interface ports 110 can be coupled to the network(s) 12 to provide network connectivity to the ToR switch enclosure group 100. The ToR switch enclosure group 100 also includes a blade sub-enclosure 112. The blade sub-enclosure 112 includes a computer system 114, such as a blade server, and a DEM 116. The blade sub-enclosure 112 can correspond to a sub-enclosure 18 in the example of FIG. 1, such that the DEM 116 can correspond to the associated DEM 20 in the example of FIG. 1. As an example, the computer system 114 can be communicatively coupled to the DEM 116 through a backplane. The computer system 114 includes a NIC 118 that is coupled to the computer system 114 and can provide network interface for the computer system 114. In the example of FIG. 3, the DEM 116 is communicatively coupled to the $Z^{th}$ one of the physical interface ports 110 of the ToR switch system 106 of the ToR enclosure 102 via a DEM physical (PHY-layer) interface 120. Therefore, the computer system 114 can be provided network connectivity to the network(s) 12 via the ToR switch system 106.

In addition, the ToR switch enclosure group 100 can include one or more additional sub-enclosures that can be configured substantially the same as the blade sub-enclosure 112. For example, the additional one or more sub-enclosures 112 can be communicatively coupled to separate respective physical interface ports 110 of the ToR switch system 106 to provide network connectivity of computer systems associated with the one or more additional sub-enclosures 112 to the network(s) 12 via the ToR switch system 106. Furthermore, the ToR switch enclosure group 100 can be part of a network logical domain, such that the ToR switch system 106 can be communicatively coupled via separate respective physical interface ports 110 to a ToR switch system of one or more separate ToR enclosure that can be configured substantially the same as the ToR enclosure 102. As an example, the ToR switch system 106 can be coupled to a ToR switch system of a respective first separate ToR enclosure via a first physical interface port 110 and to a ToR switch system of a respective second separate ToR enclosure via a second physical interface port 110. Thus, the ToR enclosures 102 can be communicatively coupled in a loop arrangement. Furthermore, the ToR switch enclosure group 100 can be implemented in a network logical domain with blade switch enclosure groups, such as similar to the blade switch enclosure group 50 in the example of FIG. 2.

Figure 4:
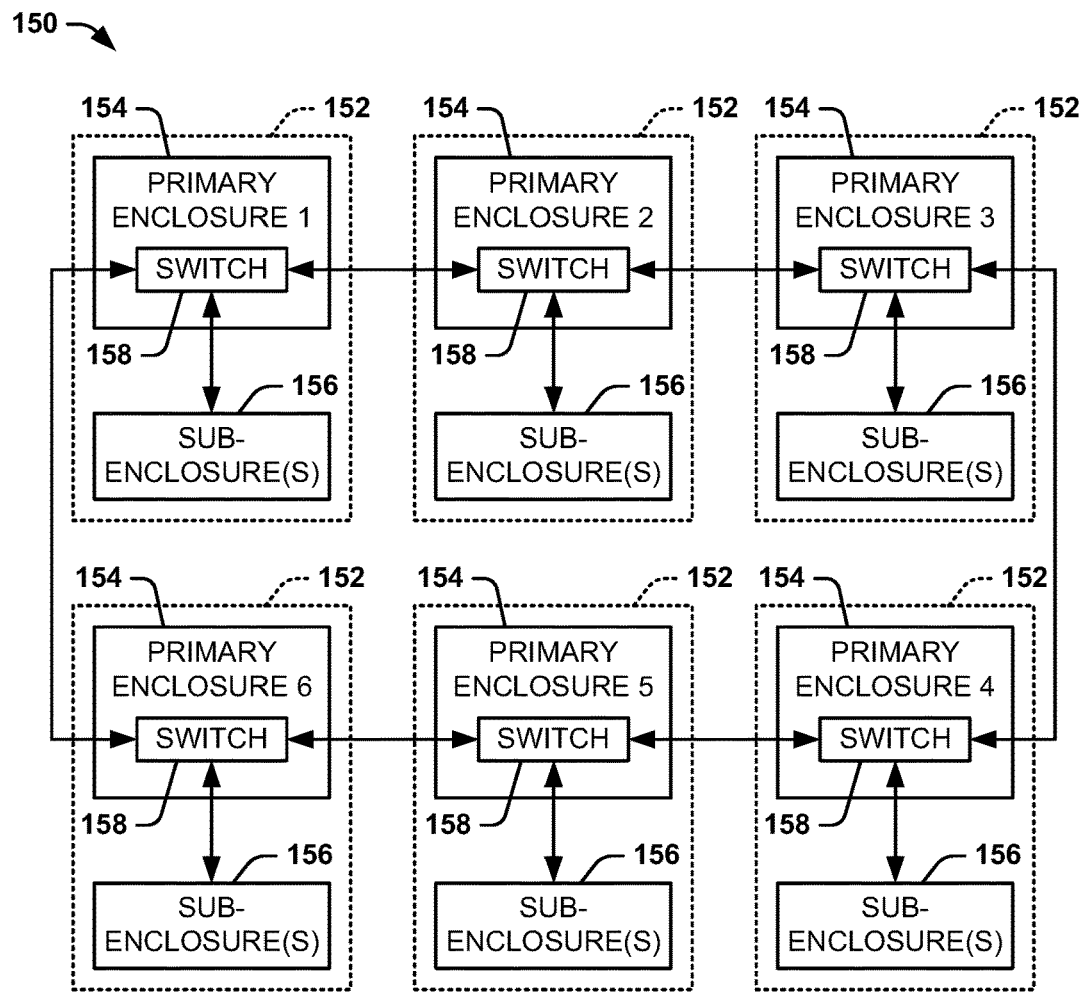
FIG. 4 illustrates an example of a network logical domain in a network system.

FIG. 4 illustrates an example of a network logical domain 150 in a network system. For example, the network logical domain 150 can be configured substantially similar to the network system 10 in the example of FIG. 1. The network logical domain 150 includes a plurality of enclosure groups 152, demonstrated in the example of FIG. 4 as a quantity six. Each of the enclosure groups 152 can be separately communicatively coupled to a network (e.g., the network(s) 12).

The enclosure groups 152 each include a primary enclosure 154 and one or more sub-enclosures 156. As an example, the primary enclosures 154 can include a blade server. In the example of FIG. 4, each of the primary enclosures 154 includes a network switch system 158. As an example, the network switch system 158 associated with each of the primary enclosures 154 can be configured as a blade switch, which can be configured substantially similar to the blade switch system 56 or the ToR switch system 106 in the respective examples of FIGS. 2 and 3. Thus, each of the network switch systems 158 can include a plurality of physical interface (PHY-layer) ports that can be controlled to provide communicative connectivity of the components of the network logical domain 150. As an example, one of the physical interface ports of the network switch system 158 in each of the primary enclosures 154 can be coupled to the network.

Each of the sub-enclosures 156 can be configured substantially similar to the blade sub-enclosure 62 in the example of FIG. 2 or the blade sub-enclosure 112 in the example of FIG. 3. Therefore, each of the sub-enclosures 156 can include a downlink extension module that can provide connectivity of a respective computer system to the associated network. The DEM in each of the sub-enclosures 156 can be communicatively coupled to a respective one of the physical interface ports of the network switch system 158 of the respective one of the primary enclosures 154. Therefore, the computer system associated with each of the sub-enclosures 156 can be communicatively coupled to one or more networks (e.g., the network(s) 12) via the network switch system 158 in the respective primary enclosures 154.

In addition, the network switch system 158 of each of the primary enclosures 154 is coupled to a network switch system 158 of two other primary enclosures 154. As an example, each of the network switch systems 158 can have a first physical interface port that is coupled to a physical interface port of a first additional network switch system 158 and a second physical interface port that is coupled to a physical interface port of a second additional network switch system 158. Therefore, the enclosure groups 152 are demonstrated as communicatively coupled via the respective network switch systems 158 in a loop arrangement. Specifically, the first primary enclosure 154 is communicatively coupled to the second and sixth primary enclosures 154, the second primary enclosure 154 is communicatively coupled to the first and third primary enclosures 154, and the third primary enclosure 154 is communicatively coupled to the second and fourth primary enclosures 154. Similarly, the fourth primary enclosure 154 is communicatively coupled to the third and fifth primary enclosures 154, the fifth primary enclosure 154 is communicatively coupled to the fourth and sixth primary enclosures 154, and the sixth primary enclosure 154 is communicatively coupled to the fifth and first primary enclosures 154.

Based on the loop arrangement of the enclosure groups 152, the computer systems in a given one of the enclosure groups can have wire speed connectivity to the network switch system 158. Additionally between separate respective enclosure groups 152, the bandwidth of the communicative connection can be chosen to accommodate the expected traffic between the separate respective enclosure groups 152. Thus, the network logical domain 150 can provide flat network access to all of the computer systems associated with the primary enclosures 154 and the sub-enclosures 156 within the network logical domain 150. Additionally, the network logical domain 150 can be implemented at a significant less cost and with less power consumption than typical network architecture topologies.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A network system comprising:
a primary enclosure comprising a network switch system that comprises a plurality of physical interface ports, wherein a first one of the plurality of physical interface ports is to communicatively couple to a network; and
a sub-enclosure comprising a computer system to which a network interface card (NIC) is coupled and a downlink extension module (DEM) that is communicatively coupled with the computer system and a second one of the plurality of physical interface ports of the network switch system to provide network connectivity of the computer system to the network via the network switch system;
wherein the primary enclosure is a first primary enclosure comprising a first network switch system that comprises a plurality of physical interface ports, wherein the sub-enclosure is a first sub-enclosure comprising a first computer system to which a first NIC is coupled and a first DEM, the s stem further comprising:
a second primary enclosure comprising a second network switch system that comprises a plurality of physical interface ports, wherein a first one of the plurality of physical interface ports of the second network switch system is to communicatively couple to the network; and
a second sub-enclosure comprising a second computer system to which a second NIC is coupled and a second DEM that is communicatively coupled with a second one of the plurality of physical interface ports of the second network switch system to provide network connectivity of the second computer system to the network via the second network switch system, wherein the first and second primary enclosures and the first and second sub-enclosures are collectively arranged as a network logical domain.

2. The system of claim 1, wherein the sub-enclosure comprises a first computer system to which a first NIC is coupled, wherein the primary enclosure further comprises a second computer system to which a second MC is coupled to provide network connectivity of the second computer system to the network via the network switch system.

3. The system of claim 1, wherein the sub-enclosure is a first sub-enclosure comprising a first computer system to which a first NIC is coupled and a first DEM, the system further comprising a second sub-enclosure comprising a second computer system to which a second NIC is coupled and a second DEM that is communicatively coupled with a third one of the plurality of physical interface ports of the network switch system to provide network connectivity of the second computer system to the network via the network switch system.

4. The system of claim 1, wherein a third one of the plurality of physical interface ports of the first network switch system associated with the first primary enclosure is communicatively coupled with a third one of the plurality of physical interface ports of the second network switch system associated with the second primary enclosure.

5. The system of claim 1, wherein the primary enclosure is configured as a blade enclosure, wherein the network switch system is configured as a blade switch system.

6. The system of claim 1, wherein the primary enclosure is configured as a top-of-rack (ToR) enclosure, wherein the network switch system is configured as a ToR switch system.

7. The system of claim 1, wherein the network switch system is a first network switch system and the DEM is a first DEM, wherein the sub-enclosure further comprises a second network switch system that comprises a corresponding plurality of physical interface ports, wherein a first one of the corresponding plurality of physical interface ports is to communicatively couple to the network, and wherein the primary enclosure further comprises a second DEM that is communicatively coupled with a second one of the corresponding plurality of physical interface ports of the second network switch system.

8. A network system comprising:
a primary enclosure comprising a blade switch system that comprises a plurality of physical interface ports, wherein a first one of the plurality of physical interface ports is to communicatively couple to a network, and further comprising a first computer system to which a first network interface card (NIC) is coupled to provide network connectivity of the first computer system to the network via the blade switch system; and
a sub-enclosure comprising a second computer system to which a second NIC is coupled and a downlink extension module (DEM) that is communicatively coupled with the second computer system and a second one of the plurality of physical interface ports of the blade switch system to provide network connectivity of the second computer system to the network via the blade switch system;

wherein the primary enclosure is a first primary enclosure comprising a first blade switch system that comprises a plurality of physical interface ports, wherein the sub-enclosure is a first sub-enclosure comprising a first DEM, and the system further comprises:
- a second primary enclosure comprising a second blade switch system that comprises a plurality of physical interface ports, wherein a first one of the plurality of physical interface ports of the second blade switch system is to communicatively couple to the network; and
- a second sub-enclosure comprising a third computer system to which a third NIC is coupled and a second DEM that is communicatively coupled with the third computer system and a second one of the plurality of physical interface ports of the second blade switch system to provide network connectivity of the second computer system to the network via the second blade switch system, wherein the first and second primary enclosures and the first and second sub-enclosures are collectively arranged as a network logical domain.

9. The system of claim 8, wherein the sub-enclosure is a first sub-enclosure a first DEM, the system further comprising a second sub-enclosure comprising a third computer system to which a third NIC is coupled and a second DEM that is communicatively coupled with the third computer system and a third one of the plurality of physical interface ports of the blade switch system to provide network connectivity of the third computer system to the network via the blade switch system.

10. The system of claim 8, wherein a third one of the plurality of physical interface ports of the first blade switch system associated with the first primary enclosure is communicatively coupled with a third one of the plurality of physical interface ports of the second blade switch system associated with the second primary enclosure.

11. A network system configured as a network logical domain, the network system comprising:
- a plurality of primary enclosures, each of the plurality of primary enclosures comprising a network switch system that comprises a plurality of physical interface ports, wherein a first one of the plurality of physical interface ports of each of the plurality of primary enclosures is to communicatively couple to a network, and wherein each of the plurality of primary enclosures is communicatively coupled to each other in a loop arrangement via the respective network switch system associated with each of the plurality of primary enclosures, such that each of the plurality of primary enclosures is communicatively coupled to a first additional one of the plurality of primary enclosures via a second physical interface port of the respective network switch and to a second additional one of the plurality of primary enclosures via a third physical interface port of the respective network switch; and
- a plurality of sub-enclosures, each of the plurality of sub-enclosures comprising:
  - a computer system to which a network interface card (NIC) is coupled; and
  - a downlink extension module (DEM) that is communicatively coupled with the computer system and a second one of the plurality of physical interface ports of the network switch system associated with one of the plurality of primary enclosures to provide network connectivity of the respective computer system to the network via the network switch system associated with one of the plurality of primary enclosures;

wherein a quantity of the plurality of sub-enclosures is greater than a quantity of the plurality of primary enclosures, such that the network switch system associated with each of at least a portion of the plurality of primary enclosures is communicatively coupled to a DEM associated with each of a plural grouping of the plurality of sub-enclosures via respective physical interface ports of the network switch system associated with each of the at least a portion of the plurality of primary enclosures.

12. The system of claim 11, wherein each of the plurality of primary enclosures further comprises a respective additional computer system to which a respective additional NIC is coupled to provide network connectivity of the respective additional computer system to the network via the network switch system.

* * * * *